United States Patent [19]

Boone

[11] 3,943,966

[45] Mar. 16, 1976

[54] IRRIGATION SYSTEM (LIFTING DOGS)

[76] Inventor: Ralph D. Boone, 2920 Axtell, Clovis, N. Mex. 88101

[22] Filed: Nov. 27, 1974

[21] Appl. No.: 527,598

[52] U.S. Cl................................. 137/344; 239/177
[51] Int. Cl.² ........................................ A01G 25/02
[58] Field of Search...................... 137/344; 239/177

[56] References Cited
UNITED STATES PATENTS

| | | | |
|---|---|---|---|
| 3,394,729 | 7/1968 | Bower et al......................... | 137/344 |
| 3,500,856 | 3/1970 | Boone et al......................... | 137/344 |
| 3,628,729 | 12/1971 | Thomas ........................... | 137/344 X |
| 3,692,045 | 9/1972 | Carr................................... | 137/344 |
| 3,766,937 | 10/1973 | Lundvall et al..................... | 137/344 |

*Primary Examiner*—Martin P. Schwadron
*Assistant Examiner*—Robert J. Miller
*Attorney, Agent, or Firm*—Wendell Coffee

[57] ABSTRACT

An agricultural irrigation system has two reciprocating cables which are reciprocated at a main pivot and connected by chain and sprocket at the far end. Alternate vehicles are attached to one or the other cables. At each vehicle the cable acts to both align the vehicle and power it through a "joy stick" attached. Reciprocating motion of the "joy stick" powers the vehicle and tilting motion aligns it. The alignment is accomplished by lifting the dog from a ratchet wheel.

12 Claims, 11 Drawing Figures

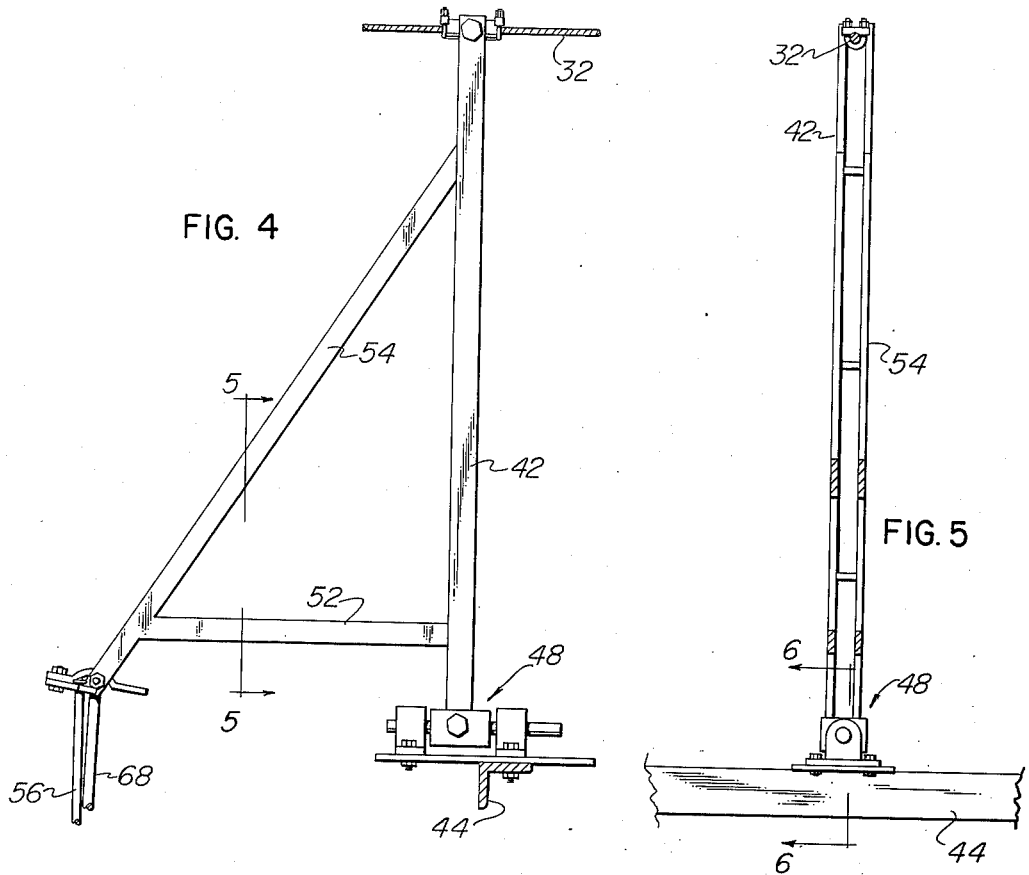
FIG. 4
FIG. 5
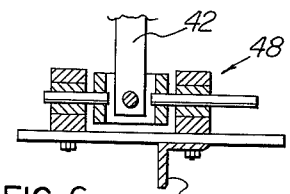
FIG. 6
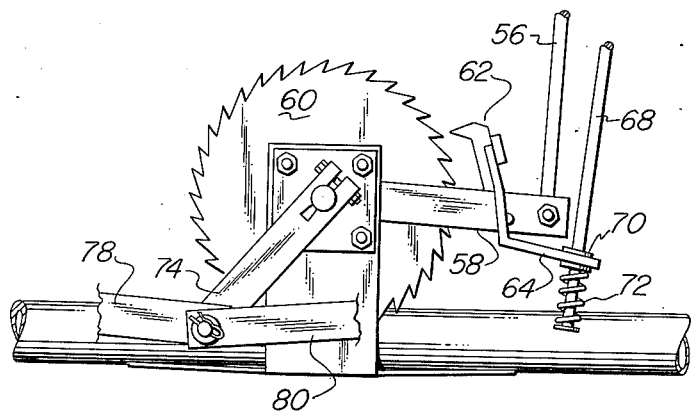
FIG. 7

IRRIGATION SYSTEM (LIFTING DOGS)

BACKGROUND OF THE INVENTION

1. Field of the Invention

This invention relates to agricultural irrigation and more particularly to the movement and alighment of an irrigation pipe with sprinklers thereon.

2. Description of the Prior Art

The patent obtained by PURTELL and myself, U.S. Pat. No. 3,500,856, discloses an irrigation system with a driving chalk line wherein the drive arm 110 connects a single cable to the vehicle, the single cable both driving the vehicle and furnishing the alignment for the vehicle. The alignment was transferred from the cable through drive arm by having teeth on the drive arm either engaging or not engaging a power lever. The drive was transmitted from this to a vehicle by a foot.

SUMMARY OF THE INVENTION

1. New and Different Function

I have now improved upon the system of the prior art by providing a continuous moving system which has a more constant movement, thus, eliminating some of the difficulties of having the system intermittently moving. Also, I have used two driving cables so as to reduce the power and strength of the cable. Further, I have improved the reversing dogs which transmit power from the trojan bar to the wheels.

2. Objects of the Invention

An object of this invention is to irrigate agricultural land.

Another object is to maintain in operative alignment a system to achieve the above.

Other objects are to achieve the above with a device that is sturdy, compact, durable, lightweight, simple, safe, efficient, versatile, and reliable, yet inexpensive and easy to manufacture, install, adjust, operate and maintain.

Further objects are to achieve the above with a method that is versatile, rapid, efficient, and inexpensive, and does not require skilled people to install, adjust, operate, and maintain.

The specific nature of the invention, as well as other objects, uses, and advantages thereof will clearly appear from the following description and from the accompanying drawing, the different views of which are not necessarily to the same scale.

BRIEF DESCRIPTION OF THE DRAWING

FIG. 4 is a back view of the joy stick taken substantially on line 4—4 of FIG. 2 with parts omitted for clarity.

FIG. 5 is a sectional view taken on line 5—5 of FIG. 4.

FIG. 6 is a sectional view taken on line 6—6 of FIG. 5.

FIG. 7 is an enlarged side view of the ratchet as seen in FIG. 2 with parts broken away for clarity.

DESCRIPTION OF THE PREFERRED EMBODIMENT

Figure 2:
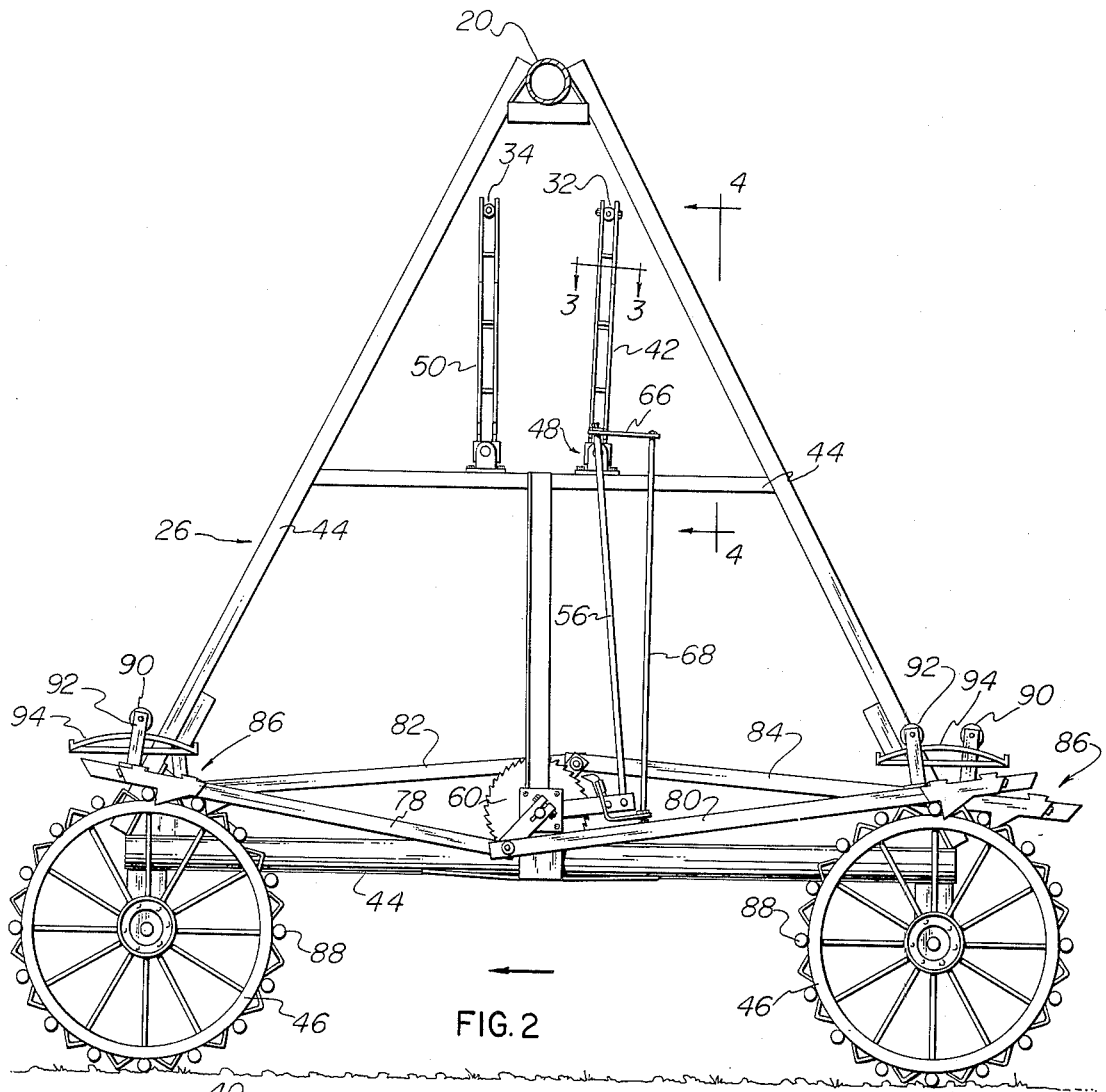
FIG. 2 is a side elevational view of one vehicle according to this invention.
Figure 1:
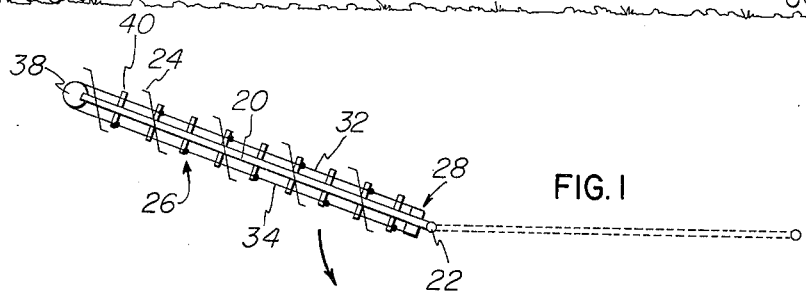
FIG. 1 is a top plan schematic representation of an irrigation system of this type.

As may be seen in the drawing, main irrigation pipe 20 is attached to a center pivot which also forms means 22 for supplying water under pressure to the pipe 20. The pipe 20 carries a plurality of sprinklers 24. The pipe is supported by a plurality of vehicles 26.

Figure 8:
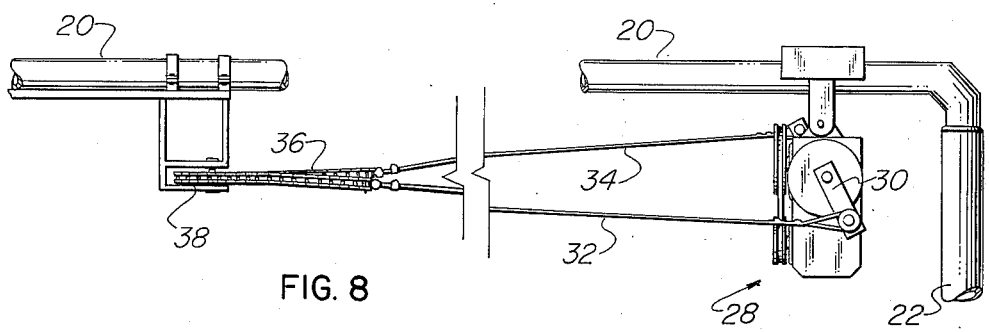
FIG. 8 is a front elevational view of portions of the system showing the pivot end and the far end showing the connection of the cables.

Power unit 28 is attached to the pipe 20 adjacent the pivot 22 (FIG. 8). It includes an electric motor which drives a pair of crank arms 30. Cable or cable run 32 is attached to one crank arm and cable or cable run 34 is attached to the other crank arm. The cables extend the entire length of the system. Chain 36 is attached to the end of each cable. The chain extends around sprocket or pulley 38 which is attached to the pipe 20 beyond outer vehicle 40. The sprocket 38 is attached by a vertically depending spindle so that the cables are in side-by-side relationship. It will be readily understood that as the crank arms 30 rotate, they impart a reciprocating movement to the cables 32 and 34.

Alternately, the vehicles 26 are attached to either the cable 32 or 34. I.e., the odd numbered vehicles could be attached to the cable 32 and the even numbered vehicles attached to cable 34. Therefore, each cable would be pulling half of the vehicles and, thus, reducing the tension upon the cables to one-half the amount which would be required if all the vehicles were attached to one cable.

It will be understood that the end vehicle 40 and those vehicles nearer to it than to the center pivot 22 could be drivingly connected to both cables 32 and 34. Therefore, these double-connected vehicles would be driven at twice the speed of the single-connected vehicles as illustrated in FIG. 2.

Each of the vehicles 26, with the exception of the outer most vehicle 40, are substantially identical. Therefore, one typical vehicle 26 will be described in detail and it will be understood that the others are the same, except for the attachment of joy stick or stiff arm 42 as will be explained in the description.

Each vehicle has frame 44. The frame connects two wheels 46 and supports the pipe 20. Inasmuch as the bracing and truss structure to support the pipe between vehicles, etc., are all well known to the art, they will not be discussed in detail herein, however, all those conventional items, it will be understood, are included.

Joy stick or stiff arm 42 is attached by universal joint or universal pivot 48 to the frame 44. (FIGS. 4, 5, and 6). The joy stick extends upward from the universal joint 48. Power cable 32 is attached to the top of the joy stick 42. Likewise, joy stick 50 is attached to the frame and is connected to the cable 34. The joy stick 42 is in the form of a bell crank and has foot 52 which extends parallel to the cable 32. Brace 54 extends from the end of the foot 52 to the upper portion of the joy stick 42. Pittman 56 connects to the juncture of brace 54 and the foot 52 and extends downward. It will be understood that the horizontal reciprocation of the cable 32, as described above, will cause a vertical reciprocation of the pitman 56.

The lower end of the pitman 56 is connected to ratchet lever 58. (FIG. 7). The ratchet crank is pivoted to the same axle as ratchet wheel 60. Pawl 62 is pivoted to the ratchet lever 58. The pawl is pivoted at midpoint to the ratchet lever and a portion extending away from the wheel is called tail 64.

Heel 66 extends rearwardly from the pitman 56 at the brace 54 of the foot 52. Byy rearwardly, I means opposite the direction of travel of the vehicle 26. It is important to note that when the direction of travel of the vehicle 26 is reversed, it is necessary also to reverse the heel 66 upon the joy stick 42 so alignment is obtained. Pitman 68 extends from the heel 66 to the tail 64. (FIG. 7). Nut 70 on the pitman 68 rides on top of the tail and helical compression spring 72 rides below the tail 64. Therefore, if the vehicle is ahead of the line as established by the cable 32, the joy stick will be rocked backwards inasmuch as the cable will be the rear of a normal position inasmuch as the vehicle is forward; therefore, if the joy stick 42 is rocked backward and since the heel 66 extends to the rear, the heel will be depressed which causes a downward movement of the ptiman 68 which depresses the tail 64 of the pawl 62. As may be seen when the tail is depressed, the pawl does not engage ratchet wheel 60. Therefore, reciprocation of the cable 32 will result in the reciprocation of the ratchet lever 58, but this will not drive the ratchet wheel 60. Thus, the mechanism operates as a clutch.

On the other hand, if the vehicle is behind the line as established by cable 32, the heel 66 will be raised and the tail 64 will be raised and the pawl 62 will engage the wheel 60. Spring 72 will provide the necessary clicking action. Therefore, reciprocation of the cable 32 and the ratchet lever 58 will be translated into rotational movement of the wheel 60.

It will be understood that the travel and speed of each vehicle 26 is proportional to the distance from the center pivot 22. Thus, the vehicles closer to the center 22 may be driven slower by moving the heel assembly (carrying pitmans 56 and 68) inward along the foot 52 toward the universal joint 48. Analysis will show this reduces the tension in the cables 32 and 34. Ordinary mechanics will understand how to position the heel assembly at any point along the foot 52.

Figure 3:
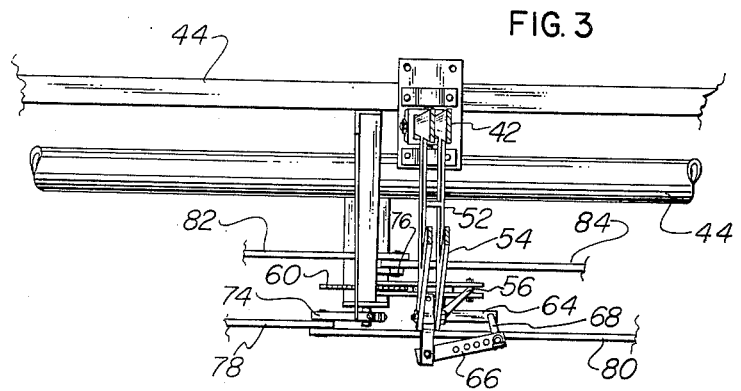
FIG. 3 is a sectional view taken substantially on line 3—3 of FIG. 2 showing details of construction.

Crank arms 74 and 76 are attached to the shaft carrying the wheel 60 so they rotate with the wheel 60. Trojan bars 78 and 80 are journaled to the crank arm 74 and trojan bars 82 and 84 are journaled to crank arm 76. (FIG. 3). Dogs 86 on the end of the trojan bars engage lugs 88 on the vehicle wheels 46. As may be seen, the trojan bars 78 and 82 go to the forward wheel, as illustrated, and the trojan bars 80 and 84 go to the rear wheel, as illustrated. Also, inasmuch as the crank arms 74 and 76 are diametrically opposed, as illustrated, trojan bars 82 and 84 are driving their respective wheels forward as trojan bars 78 and 80 are being retracted to engage the next lub 88. Therefore, with each stroke of ratchet lever 58 when the pawl 62 is engaged, each of the vehicle wheels 46 are being driven. Also, it will be apparent, if only one crank arm 74 or 76 were used, this would not be the case and the wheel would be driven only for each half revolution of the ratchet wheel 60.

It will be understood the ratchet wheel 60 is driven by the pull of the cables 32 or 34 toward the center 22. If both cables are connected, the pulls will be alternate and the rotation of the ratchet wheel 60 will be continuous or nearly so. Also, if both cables 32 and 34 are connected, a reversing mechanism (such as a rocker arm) must be used from the joy stick 50 to push the dog downward on the teeth of the wheel 60 rather than upward, as illustrated, from joy stick 42.

Also, other mechanisms may be used to drive the vehicle 26 from the rotation of the ratchet wheel 60. For example, a push foot as disclosed in U.S. Pat. No. 3,500,856, noted above, could be used. Another mechanism is that a chain drive from the ratchet wheel 60 to each vehicle wheel 46 could be used. Since chain drives from one wheel shaft to another are so common, none is illustrated here.

The end of the trojan bars are supported by roller 90 which is attached by yoke 92 to the end of the trojan bars 78, 80, 82, and 84. As seen, the roller rides on arc 94 which is attached to the frame of the vehicle. The arc is concentric to the wheel 46 which is adjacent. Therefore, the ends of the trojan bars are thus supported and guided.

Figure 10:
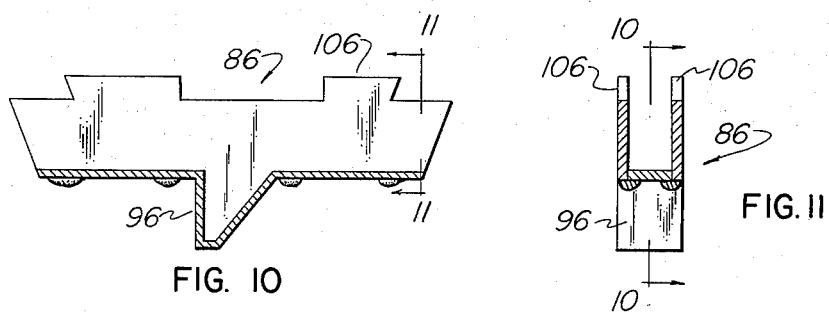
FIG. 10 is an enlarged sectional view of one of the dogs taken substantially on line 10—10 of FIG. 11.
Figure 11:
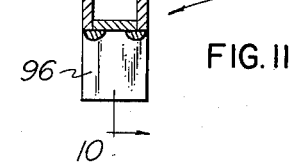
FIG. 11 is a sectional view of one of the dogs taken on line 11—11 of FIG. 10.
Figure 9:
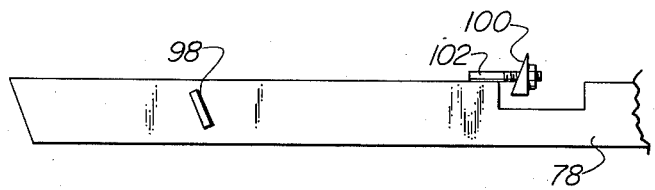
FIG. 9 is an enlarged end of one of the trojan bars as seen in FIG. 2 with the dog removed.

The direction of the vehicle travel is determined by the direction of the dogs 86; therefore, if it is desired to reverse the direction of travel of the vehicle, the dogs 86 are reversed on the trojan bars 78, 80, 82, and 84. The dog 86 is U-shaped in cross section with the depending catch 96 being the element which engages the lug 88 upon the wheel 46. (FIGS. 10 and 11). The dog is attached to the trojan bar by having a forward angled surface which bears against boss 98 welded to the trojan bar 78. The dog 86 is held in place by beveled washer bar 100 carried by bolt 102 on the trojan bar. The beveled bar engages upward extending lug 106 on the dog. As stated before, the ratchet dog determines the direction of travel of the vehicles. The direction of the ratchet wheel 60 is immaterial. Regardless of which way the ratchet wheel rotates, the vehicle will go in the direction the dogs are set on the trojan bar.

Therefore, on alternate vehicles wherein the ratchet wheel 60 is driven by the joy stick 50 attached to cable 34, it is more convenient to drive the ratchet wheel in the opposite direction, but, still, in that event, the direction of movement is controlled by the dogs 86. As mentioned before, when the direction of the vehicle is reversed, it is necessary to reverse the heel upon the joy stick to cause the system to align properly.

Also, the end vehicle 40 has no alignment mechanism upon it, but it is driven constantly. I.e., with the end vehicle being constantly driven, all of the other vehicles are aligned between the end vehicle 40 and the center pivot 22.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In an agricultural irrigation system having
   a. an elongated pipe adapted to carry sprinklers mounted thereon,
   b. means for supplying water under pressure to said pipe,
   c. a plurality of vehicles movingly supporting said pipe, d. the improved means for driving each of said vehicles comprising:
e. a reciprocating cable,
f. power means for reciprocating said cable mounted upon said pipe,
g. a first run of said reciprocating cable extending from said power means for reciprocating said cable to a pulley mounted upon the end of the pipe,
h. said reciprocating cable extending around said pulley and a second run of said reciprocating cable extending back to said power means,
j. the end of said second run of said reciprocating cable mounted to said power means,
k. said power means being means for reciprocating the ends of the cable in equal and opposite directions,
m. said vehicles being designated numerically sequentially from said power vehicle,
n. said odd numbered vehicles being connected to said first reciprocating cable run,
o. said even numbered vehicles being connected to said second reciprocating cable run, and
p. transmission means on each vehicle for driving it responsive to the reciprocation of said cable.

2. The invention as defined in claim 1 wherein said transmission means includes
q. a stiff arm connected by a universal pivot to the frame of the vehicle,
r. the stiff arm also connected to one of the cable runs,
s. said stiff arm extending transverse to the cable,
t. a foot on the stiff arm extending from the universal pivot parallel to the cable,
u. so that reciprocation of the cable results in oscillation of the foot, but said foot is basically unresponsive to lateral movement of the cable,
v. a pitman connected from said foot to a transmission element for driving the vehicle, and
w. a heel on said foot,
x. said heel laterally displaced from said foot,
y. so that said heel is responsive to lateral movement of said cable.

3. The invention as defined in claim 2 with additional limitations of
z. a pitman connected to said heel,
aa. said pitman on the heel connected to a clutch whereby the power transmission is interrupted responsive to lateral movement of the cable.

4. In an agricultural irrigation system having
a. an elongated pipe adapted to carry sprinklers mounted thereon,
b. means for supply water under pressure to said pipe,
c. a plurality of vehicles movingly supporting said pipe,
d. a cable extending along the length of the pipe,
e. said cable mounted to the two ends of the pipe for reciprocating movement,
f. power means connected to said cable for reciprocating said cable;
g. the improved drive transmission means between said cable and each of said vehicles for driving said vehicles in alignment comprising:
h. a stiff arm connected by a universal pivot to the frame of the vehicle,
j. the stiff arm also connected to the cable,
k. said stiff arm extending transverse to the cable,
m. a foot on the stiff arm extending from the universal pivot parallel to the cable,
n. so that reciprocation of the cable results in oscillation of the foot, but said foot is basically unresponsive to lateral movement of the cable,
o. a pitman connected from said foot to a transmission element for driving the vehicle, and
p. a heel on said foot,
q. said heel laterally displaced from said foot,
r. so that said heel is responsive to lateral movement of said cable.

5. The invention as defined in claim 4 with additional limitations of
s. a pitman connected to said heel,
t. said pitman on the heel connected to a clutch whereby the power transmission is interrupted responsive to lateral movement of the cable.

6. The invention as defined in claim 4 wherein said transmission element includes
s. a ratchet lever attached to said pitman,
t. a ratchet wheel pivoted to said frame for operative relationship to said ratchet lever,
u. a pawl on said ratchet lever in operative relationship to said ratchet, and
v. a connection from said heel to said pawl to inactivate said pawl responsive to movement of said heel.

7. The invention as defined in claim 6 with additional limitations of
w. crank arm on said ratchet wheel,
x. trojan bar attached to said ratchet wheel crank arm,
y. a wheel journaled to said frame,
z. said trojan bar extending to said wheel,
aa. a dog on the trojan bar.

8. The invention as defined in claim 7 with additional limitations of
bb. said dog is reversible on said trojan bar,
cc. said dog being U-shaped in cross section,
dd. said dog having a depending catch thereon,
ee. a lug on the wheel,
ff. the U-shaped dogs straddling said trojan bars so that said catch is adapted to engage said lug on the wheel so when the dog is reversed on the trojan bar, the vehicle travel is reversed.

9. The invention as defined in claim 8 wherein the dog fits against a boss on the trojan bar and is held snugly in position by a washer on a bolt on the trojan bar.

10. In an agricultural irrigation system having
a. an elongated pipe adapted to carry sprinklers thereon,
b. means for applying water under pressure to said pipe,
c. a plurality of vehicles movingly supporting said pipe,
d. wheels on said vehicle,
e. trojan bars on said vehicle,
f. means for reciprocating said trojan bars,
g. an improved dog for rotating said wheels responsive to reciprocation of the trojan bars comprising:
h. said dog is reversible on said trojan bar,
j. said dog being U-shaped in cross section,
k. said dog having a depending catch thereon,
m. a lug on the wheel,
n. the U-shaped dog straddling said trojan bars so that said catch is adapted to engage said lug on the wheel so when the dog is reversed on the trojan bar, the vehicle travel is reversed.

11. The invention as defined in claim 10 wherein the dog fits against a boss on the trojan bar and is held snugly in position by a washer on a bolt on the trojan bar.

12. The invention as defined in claim 4 with an additional limitation of s. speed means for adjusting the positioning of the pitman of the foot to change the speed the vehicle is driven.

* * * * *